Patented Dec. 1, 1925.

1,563,891

UNITED STATES PATENT OFFICE.

ALFRED W. BOSWORTH AND LEWIS H. CHRYSLER, OF COLUMBUS, OHIO.

PROCESS OF TREATING MILK.

No Drawing. Application filed December 20, 1924. Serial No. 757,271.

*To all whom it may concern:*

Be it known that we, ALFRED W. BOSWORTH and LEWIS H. CHRYSLER, citizens of the United States, residing at Columbus, in the county of Franklin and State of Ohio, have invented certain new and useful Improvements in Processes of Treating Milk, of which the following is a specification.

Underlying the present invention is the observation that milk from the cow or any other lower animal when used as a food for infants contains an excessive amount of calcium which interferes with the proper digestion or assimilation of some of the other food elements present in such milk, and often results in serious intestinal and nutritional disturbances; also the observation that the removal of the excess calcium from the milk results in an almost complete digestibility and assimilability of all the remaining food elements.

Our invention relates to a process for the removal of a part or the whole of the calcium from milk, which process shall leave the milk in such condition that it may be further used for the compounding of foods, especially infant foods, by the addition of other ingredients, such as fats, oils, proteins and carbohydrates, in the proportions desired, and this compound may then be used as such or diluted or concentrated or dried to a powder.

Our process is based upon the fact that calcium may be removed from solution in water by the addition of phosphoric acid, or a soluble phosphate, followed by an adjustment of the solution to a proper degree of alkalinity by the addition of the correct amount of an alkali.

By this treatment that portion of the calcium of the milk which initially existed in the form of calcium phosphate is not altered, while the remainder of the calcium present is converted into the phosphate. Upon addition of alkali (say soda, potash or ammonia, either caustic or carbonate) to slightly alkaline reaction, the calcium phosphate is precipitated in the form of a gel or precipitate which can be separated by filtration or centrifugation. A point of special importance is that it is not necessary to first remove the casein of the milk, as would be necessary with some other processes which might be used for the removal of the calcium.

In carrying out our process, starting from raw, fresh milk, we preferably employ nine steps (some of which are to a degree optional), broadly stated as follows:

First, removal of the fat;

Second, addition of phosphoric acid or soluble phosphate;

Third, heating to hasten the chemical reaction or double decomposition;

Fourth, adjustment of the alkalinity by the addition of an alkali;

Fifth, allowing to stand so that the gel or precipitate may settle out;

Sixth, addition of water to hasten syneresis or expulsion of water from the gel;

Seventh, removal of the insoluble calcium phosphate by filtration or the application of centrifugal force;

Eighth, addition of an acid in order to neutralize the alkalinity and to convert the alkali to a neutral salt;

Ninth, pasteurization or sterilization of the resulting decalcified diluted skimmed milk.

A more detailed outline of the process is as follows:

The milk is first subjected to centrifugal action whereby substantially all of the fat is removed in the form of cream.

To the fat-free milk thus obtained, phosphoric acid or a soluble phosphate is now added, the amount being dependent upon the final result desired. To remove all the calcium from 100 lbs. of milk we add 174 grams of sodium-acid-phosphate ($NaH_2PO_4.H_2O$) or its molecular equivalent of phosphoric acid or any phosphate of sodium or potassium. To remove two thirds of the calcium from the milk we add 87 grams of sodium-acid-phosphate or its molecular equivalent of phosphoric acid or any phosphate of sodium or potassium.

The milk is now heated to about 110 degrees F., to hasten the chemical reaction or double decomposition.

The degree of acidity is determined by titrating 100 cc. with, say, tenth normal alkali using phenolphthalein as an indicator, each cubic centimeter of alkali used in the titration being equal to 1 degree of acidity. For each 100 lbs. of fat-free milk add 1.8 grams of caustic soda (NaOH) for each degree of acidity. This will bring the milk to neutrality. The caustic soda is dissolved in water before it is added to the milk. For each 100 lbs. of fat-free milk we then add a further 48 grams of caustic soda (dissolved in water) to bring the milk to the proper degree of alkalinity for the prompt separation of the insoluble calcium phosphate. In this step of the process we prefer to use 48 grams of caustic soda per 100 pounds of milk, but we may use less if we desire to reduce the amount of sodium chloride left in the final product. If we use less caustic soda at this step, the time required for the separation of the insoluble calcium phosphate will be materially lengthened.

After the last addition of caustic soda the milk is allowed to stand until a firm gel has formed. This may ordinarily require, with the preferred alkalinity, about thirty minutes.

This gel is then broken up and cold water added, preferably at the rate of 75 pounds for each 100 pounds of fat-free milk. The diluted milk is now gently agitated to hasten the expulsion of water from the gel. At the end of about an hour the mixture of diluted milk and insoluble calcium phosphate is filtered, or subjected to centrifugal force, to remove the calcium phosphate.

The degree of alkalinity of the diluted milk is now determined, say, by titrating 100 cc. with tenth normal acid using phenolphthalein as an indicator. Each cubic centimeter of tenth normal acid used in the titration is equal to one degree of alkalinity. Now weigh the diluted milk and add 1.62 grams of hydrochloric acid, or 4.629 grams of 35% hydrochloric acid, per 100 pounds of the diluted milk for each degree of alkalinity.

The addition of hydrochloric acid at this point converts the caustic soda, which causes the alkalinity, into sodium chloride and brings the milk to the neutral point.

If it is desired that the finished product have an acid reaction, sufficient hydrochloric acid may be added at this time to attain the desired result. Under ordinary conditions the acidity should not be greater than five degrees. As the milk secured in some locations or in certain times of the year may be low in its citric acid content, it may be desirable to add citric acid at this point of the process. If this is found desirable the citric acid added should replace a chemically equivalent amount of the hydrochloric acid. Under ordinary conditions the amount of citric acid should not exceed 0.15 per cent of the fat-free milk.

The resulting decalcified and diluted fat-free milk, after pasteurization, is now ready for use. It may be diluted, concentrated or reduced to a dry powder, or it may be combined with other food substances and then diluted, concentrated or reduced to a dry powder.

What is claimed is:

1. A process of improving milk which comprises the steps of adding a substance containing the phosphoric acid radical under conditions capable of leaving the casein of the milk still in solution, rendering the milk slightly alkaline, whereby calcium present in the milk is converted into insoluble calcium phosphate, removing the latter from the milk, and thereafter neutralizing any undesired excess of alkali in the milk.

2. A process of improving milk which comprises the steps of adding a substance containing the phosphoric acid radical in amount insufficient to coagulate or precipitate the casein, rendering the milk slightly alkaline, whereby calcium present in the milk is converted into insoluble calcium phosphate, and removing the latter from the milk.

3. A process of improving milk which comprises the steps of removing the fat from the milk, thereafter adding a substance containing the phosphoric acid radical in amount insufficient to coagulate or precipitate the casein, rendering the milk slightly alkaline, whereby the calcium present in the milk is converted into insoluble calcium phosphate, removing the latter from the milk, and thereafter neutralizing any undesired excess of alkali in the milk.

4. A process which comprises adding to substantially fat-free milk a soluble material containing the phosphoric acid radical under conditions capable of leaving the casein of the milk still in solution, rendering the liquid alkaline, removing the precipitated calcium phosphate and neutralizing the akalinity, all without removing the casein of the milk at any stage of the process.

5. A process which comprises adding to substantially fat-free milk a soluble material containing the phosphoric acid radical without acidifying the milk sufficiently to precipitate the casein, rendering the liquid alkaline, adding water to dilute the mixture, removing the precipitated calcium phosphate and neutralizing the alkalinity, all without removing the casein of the milk at any stage of the process.

6. A process which comprises removing the bulk of the fat from milk, adding a soluble compound containing the phosphoric acid radical in amount chemically equivalent to a substantial part at least of the calcium content of the milk, but in amount insufficient to precipitate any large part of the casein content of the milk, warming the mixture to assist the chemical reaction, rendering slightly alkaline, diluting, separating the bulk of the precipitated insoluble calcium compound, and neutralizing the undesired excess of alkali.

7. A process which comprises removing the bulk of the fat from milk, adding a somewhat acid soluble compound containing the phosphoric acid radical in amount chemically equivalent to a substantial part at least of the calcium content of the milk, but in amount insufficient to precipitate any large part of the casein content of the milk, warming the mixture to assist the chemical reaction, rendering slightly alkaline, diluting, separating the bulk of the precipitated insoluble calcium compound, and neutralizing the undesired excess of alkali.

In testimony whereof we have signed our names to this specification.

ALFRED W. BOSWORTH.
LEWIS H. CHRYSLER.